(12) United States Patent
Masuda et al.

(10) Patent No.: US 7,849,674 B2
(45) Date of Patent: Dec. 14, 2010

(54) EXHAUST EMISSION PURIFYING APPARATUS FOR ENGINE

(75) Inventors: Kouji Masuda, Ageo (JP); Kiminobu Hirata, Ageo (JP); Hisashi Akagawa, Ageo (JP); Shuichi Nakamura, Ageo (JP); Hiroki Ueno, Ageo (JP); Ikuo Sakai, Ageo (JP)

(73) Assignee: Nissan Diesel Motor Co., Ltd., Ageo-Shi, Saitama-Ken (JP)

( * ) Notice: Subject to any disclaimer, the term of this patent is extended or adjusted under 35 U.S.C. 154(b) by 1093 days.

(21) Appl. No.: 10/572,558

(22) PCT Filed: Sep. 2, 2004

(86) PCT No.: PCT/JP2004/012743

§ 371 (c)(1),
(2), (4) Date: Sep. 20, 2006

(87) PCT Pub. No.: WO2005/028826

PCT Pub. Date: Mar. 31, 2005

(65) Prior Publication Data

US 2007/0180816 A1      Aug. 9, 2007

(30) Foreign Application Priority Data

Sep. 19, 2003   (JP)   ............................ 2003-327591
Sep. 30, 2003   (JP)   ............................ 2003-339246
Sep. 30, 2003   (JP)   ............................ 2003-339247

(51) Int. Cl.
 *F01N 3/00* (2006.01)
(52) U.S. Cl. ............................ 60/286; 60/295; 60/297; 60/301; 60/303
(58) Field of Classification Search .................. 60/274, 60/286, 295, 297, 301, 303
See application file for complete search history.

(56) References Cited

U.S. PATENT DOCUMENTS

| 3,556,734 A | 1/1971 | Peterson |
| 5,116,579 A | 5/1992 | Kobayashi et al. |
| 5,140,814 A | 8/1992 | Kreutmair et al. |

(Continued)

FOREIGN PATENT DOCUMENTS

DE    199 56 493    11/1999

(Continued)

*Primary Examiner*—Binh Q Tran
(74) *Attorney, Agent, or Firm*—McDermott Will & Emery LLP

(57) ABSTRACT

A $NO_x$ reduction catalyst and an ammonia slip oxidation catalyst are disposed in an exhaust system in this order, and also, an electric fan is disposed on piping which communicates an upper space of a storage tank storing therein a reducing agent with the exhaust upstream of the $NO_x$ reduction catalyst. Then, when the temperature of the ammonia slip oxidation catalyst reaches or exceeds the temperature for activating a catalyst thereof, the electric fan is operated for a predetermined period of time, so that the gas (ammonia series gas) in the upper space of the storage tank is forcibly discharged to the upstream side of the $NO_x$ reduction catalyst. Further, a discharge-forcing device, such as an electric fan or the like, forcibly discharging the gas in the upper space of the storage tank, an adsorbing device temporarily adsorbing thereto the forcibly discharged gas and an oxidation catalyst oxidizing the gas desorbed from the adsorbing device, may be disposed to the storage tank in this order.

18 Claims, 6 Drawing Sheets

U.S. PATENT DOCUMENTS

| | | | |
|---|---|---|---|
| 5,176,325 A | 1/1993 | Vidusek | |
| 5,372,312 A | 12/1994 | Vidusek | |
| 5,431,893 A | 7/1995 | Hug et al. | |
| 5,553,783 A | 9/1996 | Slavas et al. | |
| 5,601,792 A | 2/1997 | Hug et al. | |
| 5,603,453 A | 2/1997 | Weaver et al. | |
| 5,605,042 A | 2/1997 | Stutzenberger | |
| 5,606,856 A | 3/1997 | Linder et al. | |
| 5,832,720 A | 11/1998 | Svahn | |
| 5,884,475 A | 3/1999 | Hofmann et al. | |
| 5,974,789 A | 11/1999 | Mathes et al. | |
| 5,992,141 A | 11/1999 | Berriman et al. | |
| 6,041,594 A | 3/2000 | Brenner et al. | |
| 6,050,088 A | 4/2000 | Brenner | |
| 6,098,896 A | 8/2000 | Haruch | |
| 6,167,698 B1 | 1/2001 | King et al. | |
| 6,260,353 B1 | 7/2001 | Takahashi | |
| 6,279,603 B1 | 8/2001 | Czarnik et al. | |
| 6,382,600 B1 | 5/2002 | Mahr | |
| 6,387,336 B2 * | 5/2002 | Marko et al. | 423/212 |
| 6,513,323 B1 | 2/2003 | Weigl et al. | |
| 6,637,196 B1 * | 10/2003 | Tost | 60/286 |
| 6,725,651 B2 * | 4/2004 | Itoh et al. | 60/286 |
| 6,814,303 B2 | 11/2004 | Edgar et al. | |
| 6,878,359 B1 * | 4/2005 | Mathes et al. | 423/239.1 |
| 6,912,846 B2 | 7/2005 | Huber et al. | |
| 6,928,807 B2 * | 8/2005 | Jacob et al. | 60/286 |
| 7,065,958 B2 * | 6/2006 | Funk et al. | 60/286 |
| 2003/0188528 A1 | 10/2003 | Tost | |
| 2004/0045284 A1 | 3/2004 | Ripper et al. | |

FOREIGN PATENT DOCUMENTS

| | | |
|---|---|---|
| DE | 19855338 | 6/2000 |
| DE | 199 56 493 | 1/2001 |
| DE | 19946901 | 4/2001 |
| DE | 10060808 | 7/2002 |
| EP | 0 577 853 | 1/1994 |
| EP | 0886043 | 12/1998 |
| JP | 64000311 | 1/1989 |
| JP | 02-173311 | 7/1990 |
| JP | 02-218418 | 8/1990 |
| JP | 02-223624 | 9/1990 |
| JP | 02-223625 | 9/1990 |
| JP | 03-129712 | 6/1991 |
| JP | 03-242415 | 10/1991 |
| JP | 04-237860 | 8/1992 |
| JP | 04-292565 | 10/1992 |
| JP | 05-171921 | 7/1993 |
| JP | 05-222923 | 8/1993 |
| JP | 05-302509 | 11/1993 |
| JP | 06-007643 | 1/1994 |
| JP | 07-127503 | 5/1995 |
| JP | 07-279650 | 10/1995 |
| JP | 8-193511 | 7/1996 |
| JP | 8-210124 | 8/1996 |
| JP | 9-509890 | 10/1997 |
| JP | 9-511807 | 11/1997 |
| JP | 10-121949 | 5/1998 |
| JP | 11-294145 | 10/1999 |
| JP | 2000-027627 | 1/2000 |
| JP | 2000-257419 | 9/2000 |
| JP | 2000-314308 | 11/2000 |
| JP | 2001-020724 | 1/2001 |
| JP | 2001-027112 | 1/2001 |
| JP | 2001-50035 | 2/2001 |
| JP | 2001-050035 | 2/2001 |
| JP | 2001-173431 | 6/2001 |
| JP | 2001-523165 | 11/2001 |
| JP | 2002-004840 | 1/2002 |
| JP | 2002-030927 | 1/2002 |
| JP | 2002-097940 | 4/2002 |
| JP | 2002-155732 | 5/2002 |
| JP | 2002-513109 | 5/2002 |
| JP | 2002-188431 | 7/2002 |
| JP | 2002-221024 | 8/2002 |
| JP | 2002-531743 | 9/2002 |
| JP | 2002-332825 | 11/2002 |
| JP | 2003-010644 | 1/2003 |
| JP | 2003-239727 | 8/2003 |
| JP | 2003-260332 | 9/2003 |
| JP | 2003-328734 | 11/2003 |
| JP | 2004-04405 | 2/2004 |
| JP | 2004-044405 | 2/2004 |
| JP | 2002-097940 | 4/2004 |
| JP | 2004-044405 | 12/2004 |
| WO | WO 96-08639 | 3/1996 |
| WO | WO 99-30811 | 6/1999 |
| WO | WO 99-55445 | 11/1999 |
| WO | WO 03-018177 | 3/2003 |

* cited by examiner

EXHAUST EMISSION PURIFYING APPARATUS FOR ENGINE

CROSS-REFERENCES TO RELATED APPLICATIONS

This application is the National Stage of International Application No. PCT/JP2004/012743, filed on Sep. 2, 2004.

BACKGROUND OF THE INVENTION

1. Field of the Invention

The present invention relates to an exhaust emission purifying apparatus for an engine (to be referred to as exhaust emission purifying apparatus hereunder), for reductively removing, using a reducing agent, nitrogen oxides ($NO_x$) in the exhaust gas or emission (it will be referred to as "exhaust emission" hereinafter throughout the description and claims), which is exhausted from the engine, and in particular, to a technology for reducing an offensive odor which is produced when a storage tank storing the reducing agent is opened or closed.

2. Description of the Related Art

Japanese Unexamined Patent Publication No. 2000-27627 disposes an exhaust emission purifying apparatus which proposes a catalyst purifying system to remove $NO_x$ contained in the engine exhaust emission. In the disclosed exhaust emission purifying apparatus, a reduction catalyst disposed in an engine exhaust system, and a reducing agent is injected to be supplied to the upstream side of the reduction catalyst, so that $NO_x$ in the exhaust emission and the reducing agent are subjected to the catalytic-reduction reaction, to conduct purifying processing for converting the $NO_x$ into harmless components.

The reducing agent is stored in a storage tank at room temperature and in a liquid state, and the reducing agent of necessary amount corresponding to engine operating conditions is injected from an injection nozzle. Further, for the reduction reaction, ammonia having the good reactivity with $NO_x$ is used, and as the reducing agent, an aqueous urea solution is used, which is hydrolyzed by the exhaust heat and by the water vapor in the exhaust emission to easily generate ammonia.

However, according to the above-described exhaust emission purifying apparatus, if the temperature of the storage tank becomes higher due to a change in the ambient temperature and so on, the aqueous urea solution in the storage tank undergoes a chemical reaction, and ammonical gas or gases might be produce to fill an upper space of the storage tank. Then, for example when the storage tank is to be replenished with the urea aqueous solution, if an operator detaches a protective cap of the storage tank, there might occur such a situation that that the filled ammonical gas comes to leak toward the outside, to thereby produce the offensive odor. Such offensive odor will be produced not only when the aqueous urea solution is used as the reducing agent but also when a diesel oil which mainly contains the aqueous ammonia solution, hydrocarbon or the like, is used.

SUMMARY OF THE INVENTION

Therefore, in view of the above conventional problems, the present invention has an object to provide an exhaust emission purifying apparatus for an engine, for returning the gas in an upper space of a storage tank to an intake system or an exhaust system, or appropriately discharging the gas while oxidizing the gas by an oxidation catalyst, or preventing cooling water from being circulated within the storage tank when the cooling water heated by the engine has a temperature higher than a predetermined temperature, so as to suppress the offensive odor which generates when the storage tank is closably opened.

In order to achieve the above object, an exhaust emission purifying apparatus for an engine according to claim 1, comprises: a reduction catalyst disposed in an engine exhaust system, for reductively purifying nitrogen oxides with a reducing agent; a reducing agent oxidation catalyst disposed on the exhaust downstream of the reduction catalyst, for oxidizing the reducing agent passing through the reduction catalyst; a storage tank that stores therein the reducing agent; a reducing agent supply device that supplies the reducing agent stored in the storage tank to the reduction catalyst; a first discharge-forcing device that forcibly discharges the gas in an upper space of the storage tank to an intake system or the exhaust system on the upstream side of the reducing agent oxidation catalyst; a temperature detecting device that detects a temperature of the reducing agent oxidation catalyst; and a first operation control device that operates the first discharge-forcing device when the temperature detected by the temperature detecting device reaches the activating temperature of the reducing agent oxidation catalyst or above.

In accordance with the exhaust emission purifying apparatus according to claim 2, the first operation control device operates the first discharge-forcing device for a predetermined period of time, in order to avoid the excessive energy consumption.

In accordance with the invention according to claim 3, the first discharge-forcing device is an electric fan disposed on piping which provides fluid communication between the upper space of the storage tank and either the intake system or the exhaust system on the upstream side of the reducing agent oxidation catalyst.

In accordance with the exhaust emission purifying apparatus according to claim 4, the piping is disposed with a check valve which is openable only in a direction in which the gas of the upper space of the storage tank is discharged toward the intake system or the exhaust system.

In accordance with the exhaust emission purifying apparatus according to claim 5, the first discharge-forcing device comprises: a venturi disposed in the intake system or the exhausted system on the upstream side of the reducing agent oxidation catalyst; and a switching valve disposed on piping which provides a fluid communication between the upper space of the storage tank and the venturi, and the first operation control device that opens the switching valve when the temperature detected by the temperature detecting device reaches the activating temperature of the reducing agent oxidation catalyst or above.

In accordance with the exhaust emission purifying apparatus according to claim 6, the temperature detecting device indirectly detects the temperature of the reducing agent oxidation catalyst via the exhaust emission temperature on the upstream side of the reducing agent oxidation catalyst.

Another exhaust emission purifying apparatus for an engine according to claim 7, comprises: a reduction catalyst disposed in an engine exhaust system, for reductively purifying nitrogen oxides with a reducing agent; a storage tank that stores therein the reducing agent; a reducing agent supply device supplying the reducing agent from the storage tank to the reduction catalyst; a second discharge-forcing device that forcibly discharges the gas in an upper space of the storage tank; an adsorbing device that temporarily adsorbs the gas forcibly discharged by the second discharge-forcing device; and an oxidation catalyst that oxidizes the gas desorbed from the adsorbing device.

The exhaust emission purifying apparatus according to claim 8 further comprises: a reducing agent temperature detecting device that detects a temperature of the reducing agent in the storage tank; and a second operation control apparatus that operates the second discharge-forcing device when the temperature of the reducing agent detected by the reducing agent temperature detecting device is equal to or higher than the first predetermined temperature.

In accordance with the exhaust emission purifying apparatus according to claim 9, the second operation control device operates the second discharge-forcing device for a predetermined period of time, in order to avoid the excessive energy consumption.

The exhaust emission purifying apparatus according to claim 10 further comprises: a catalyst temperature detecting device that detects a temperature of the oxidation catalyst; and a catalyst activating device that activates the oxidation catalyst based on the catalyst temperature detected by the catalyst temperature detecting device.

The exhaust emission purifying apparatus according to claim 11 further comprises a heating device that heats the oxidation catalyst, and the catalyst activating device that controls the heating device so that the catalyst temperature detected by the catalyst temperature detecting device reaches the activating temperature for the oxidation catalyst or above.

In accordance with the exhaust emission purifying apparatus according to claim 12, the catalyst activating device stops an operation of the heating device when the catalyst temperature detected by the catalyst temperature detecting device reaches the second predetermined temperature or above.

In accordance with the exhaust emission purifying apparatus according to claim 13, the adsorbing device is mordenite, cobalt-supported mordenite or activated carbon.

In accordance with the exhaust emission purifying apparatus according to claim 14, the oxidation catalyst is an electrically heated honeycomb catalyst.

Further, a further exhaust emission purifying apparatus for an engine according to claim 15, comprises: a reduction catalyst disposed in an engine exhaust system, for reductively purifying nitrogen oxides with a reducing agent; a storage tank that stores therein the reducing agent; a reducing agent supply device that supplies the reducing agent stored in the storage tank to the reduction catalyst; a heating device that circulates a heating medium heated by the engine, within the tank, to heat the reducing agent stored in the storage tank; a blocking device that blocks a passage which leads the heating medium into the storage tank; a heating medium temperature detecting device that detects the temperature of the heating medium; and first control means for controlling the blocking device to block the passage, when the temperature of the heating medium detected by the heating medium temperature detecting device is higher than the third predetermined temperature.

The exhaust emission purifying apparatus according to claim 16 further comprises: a reducing agent temperature detecting device that detects a temperature of the reducing agent stored in the storage tank; and second control means for controlling the blocking device to block the passage, when the reducing agent temperature detected by the reducing agent temperature detecting device is equal to or higher than the fourth predetermined temperature.

The exhaust emission purifying apparatus according to claim 17 further comprises third control means for controlling the blocking device to forcibly cancel the blocking of the passage for a predetermined period of time, immediately after an operation of the engine is started and also when the heating medium temperature detected by the heating medium temperature detecting device is higher than the freezing temperature of the reducing agent.

In accordance with the exhaust emission purifying apparatus according to claim 18, the blocking device is manually controllable, to cancel the blocking of the passage.

According to the exhaust emission purifying apparatus of the present invention, nitrogen oxides contained in the exhaust emission of the engine is reductively purified in the reduction catalyst using the reducing agent which is supplied from the storage tank by the reducing agent supply device. Further, the reducing agent passed through the reduction catalyst is oxidized by the reducing agent oxidation catalyst disposed on the downstream side of the reduction catalyst to be converted into the harmless substance, and thereafter, is discharged into the atmosphere. On the other hand, if the temperature in the storage tank rises with a change in the ambient temperature and so on, a portion of the reducing agent is gasified due to a chemical reaction or vaporization and then, fills an upper space of the storage tank. Then, as a result that engine operating conditions are changed, so that the exhaust emission temperature rises, when the temperature of the reducing agent oxidation catalyst reaches the activating temperature or above, the gas in the upper space of the storage tank is forcibly discharged into the intake system or the exhaust system on the upstream side of the reducing agent oxidation catalyst. The gas discharged into the intake system or the exhaust system contributes to the reductive purifying reaction in the reduction catalyst, and also, is oxidized in the reducing agent oxidation catalyst to be converted into the harmless substance, and thereafter, is discharged into the atmosphere.

Consequently, even in a situation where the gas generates from the reducing agent in the storage tank, since the gas in the upper space of the storage tank is forcibly discharged, the concentration of the residual gas is significantly lowered. Therefore, if a protective cap is detached in order to fill the reducing agent into the storage tank through uncapped injection port, an operator can be almost unconscious of the odor of the reducing agent, and further, the offensive odor discharged during the opening and closing operation of the storage tank can be appreciably reduced.

Further, according to another exhaust emission purifying apparatus of the present invention, nitrogen oxides contained in the exhaust emission of the engine is reductively purified in the reduction catalyst using the reducing agent which is supplied from the storage tank by the reducing agent supply device, to be converted into the harmless substance, and thereafter, is discharged into the atmosphere. On the other hand, when the temperature in the storage tank rises with the change in the ambient temperature and so on, a portion of the reducing agent undergoes the chemical reaction or gasified, and then, fills the upper space of the storage tank. The gas in the upper space of the storage tank is forcibly discharged from the storage tank by the discharge-forcing device, to be temporarily adsorbed to the adsorbing device. Then, the gas adsorbed to the adsorbing device is gradually desorbed if predetermined conditions are satisfied, and is oxidized in the oxidation catalyst, and thereafter, is discharged into the atmosphere.

Consequently, even in the situation where the gas generates from the reducing agent in the storage tank, since the gas in the upper space of the storage tank is forcibly discharged, the concentration of the residual gas is significantly lowered.

Therefore, if the injection cap is detached in order to replenish the reducing agent into the storage tank, the operator will be able to be unconscious of the odor of the reducing agent, and further, the offensive odor discharged during the opening and closing operation of the storage tank can be reduced. Further, since the gas forcibly discharged from the upper space of the storage tank is temporarily adsorbed by the adsorbing device and thereafter is gradually desorbed, and is oxidized in the oxidation catalyst converter, it is possible to prevent the gas odor from reeking around the storage tank.

Moreover, according to the further exhaust emission purifying apparatus of the present invention, nitrogen oxides in the exhaust emission of the engine is reductively purified in the reduction catalyst using the reducing agent which is supplied from the storage tank by the reducing agent supply device. Further, since the heating medium heated by the engine is circulated within the storage tank storing the reducing agent, the reducing agent in the storage tank is heated to enable the prevention of the freeze of the reducing agent. At this time, when the temperature of the heating medium being circulated within the storage tank is higher than the third predetermined temperature, since the passage leading the heating medium into the storage tank is blocked, it is possible to prevent the heating medium whose temperature is higher than the third predetermined temperature from being circulated within the storage tank. Then, the third predetermined temperature is set to be slightly lower than the lower limit temperature at which the gas generates from the reducing agent, so that the generation of gas from the reducing agent in the storage tank can be suppressed. Therefore, if the operator opens an injection port of the storage tank, it is possible to suppress the discharge of the gas from the injection port, to thereby suppress generation of the offensive odor.

DESCRIPTION OF THE PREFERRED EMBODIMENTS

The present invention will be described hereunder, referring to the accompanying drawings.

Figure 1:
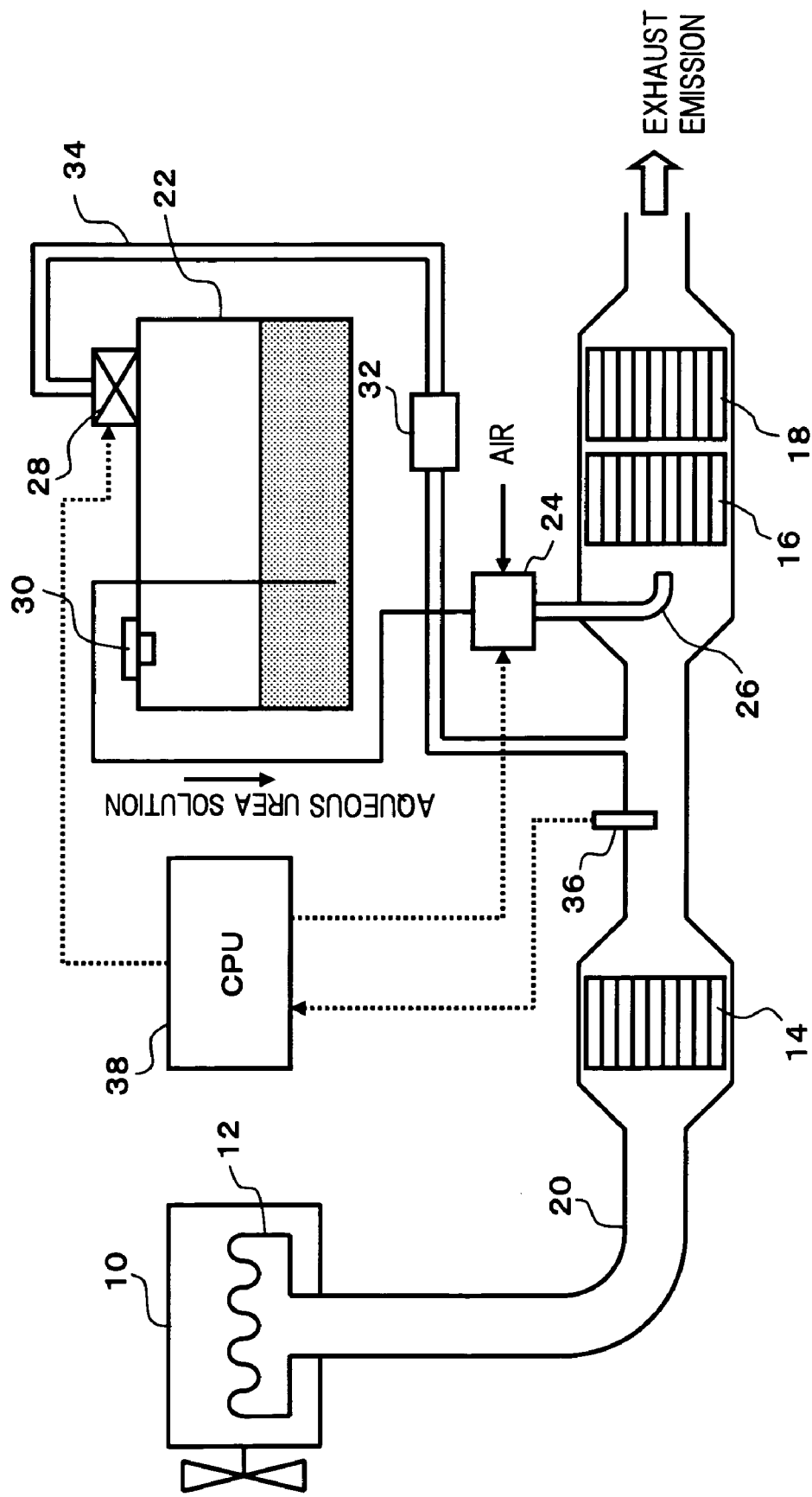
FIG. 1 is a block diagram showing a first embodiment of an exhaust emission purifying apparatus according to the present invention.

FIG. 1 shows a configuration of a first embodiment of an exhaust emission purifying apparatus according to the present invention. The exhaust emission of an engine 10, which is discharged from an exhaust manifold 12 toward the downstream of the exhaust manifold 12, passes through an exhaust pipe 20 to which an oxidation catalyst 14, a $NO_x$ reduction catalyst 16 and an ammonia slip oxidation catalyst 18 (reducing agent oxidation catalyst) are respectively disposed, to be discharged into the atmosphere. Further, a liquid reducing agent stored in a storage tank 22 which passed through a reducing agent supply device 24 and an injection nozzle 26, is injected together with the air to be supplied to the exhaust upstream of the $NO_x$ reduction catalyst 16.

Here, in the present embodiment, as the liquid reducing agent, the aqueous urea solution which easily generates ammonia by the hydrolysis is used. However, as the liquid reducing agent, diesel oil mainly containing hydrocarbon or the like may be used corresponding to a reduction reaction of the $NO_x$ reduction catalyst 16 (the same rule will be applied hereunder).

Further, on a top wall of the storage tank 22, an electric fan 28 forcibly discharging the gas (ammonia series gas) in an upper space of the storage tank 22 is attached, and also, a protective cap (protective cap) 30 an injection port through which replenishing of the aqueous urea solution is carried out is detachably attached. Further, a discharge port of the electric fan 28 is communicatively connected to the exhaust pipe 20 positioned between the oxidation catalyst 14 and the $NO_x$ reduction catalyst 16, via piping 34 disposed with a check valve 32 which is opened only to a direction for discharging the reducing agent from the storage tank 22.

On the other hand, as a control system for the reducing agent supply device 24 and the electric fan 28, a temperature sensor 36 (temperature detecting device) for detecting the exhaust emission temperature is disposed on the exhaust upstream side of a position at which the piping 34 from the storage tank 22 is connected to the exhaust pipe 20 between the oxidation catalyst 14 and the $NO_x$ reduction catalyst 16, in order to indirectly detect the temperature of the ammonia slip oxidation catalyst 18. Incidentally, if the heat-resistance of the temperature sensor 36 is sufficient, the temperature of the ammonia slip oxidation catalyst 18 may be directly detected.

Then, an exhaust emission temperature signal from the temperature sensor 36 is input to a control device 38 incorporating therein a computer. When the exhaust emission temperature reaches the activating temperature (for example, 20° C.) of the ammonia slip oxidation catalyst 18 or above, the electric fan 28 is operated for a predetermined period of time. Further, the control device 38 controls the reducing agent supply device 24, according to engine operating conditions, such as, an engine rotation speed, a fuel injection amount and the like. In the control device 38, a first operation control device is realized by a control program stored in a ROM (Read Only Memory) thereof. Further, a first discharge-forcing device comprises the electric fan 28 and the piping 34.

Next, there will be described an operation of the exhaust emission purifying apparatus of the above configuration. The exhaust emission from the engine 10 passes through the exhaust manifold 12 and the exhaust pipe 20 to be carried into the oxidation catalyst 14. In the oxidation catalyst 14, in order to improve the $NO_x$ purification efficiency in the $NO_x$ reduction catalyst 16 on the downstream of the oxidation catalyst 14, a portion of nitrogen monoxide (NO) in the exhaust emission is oxidized to be converted into nitrogen dioxide ($NO_2$). The exhaust emission in which the composition ratio between NO and $NO_x$ is improved in the oxidation catalyst 14, passes through the exhaust pipe 20 to be led into the $NO_x$ reduction catalyst 16.

On the other hand, the aqueous urea solution according to the engine operating conditions is injected together with the air from the injection nozzle 26 on the exhaust upstream of the $NO_x$ reduction catalyst 16, and the aqueous urea solution is supplied while being hydrolyzed by the exhaust heat and the water vapor in the exhaust emission to be changed into ammonia, together with the exhaust emission, to the $NO_x$ reduction catalyst 16. Then, in the $NO_x$ reduction catalyst 16, by the reduction reaction using ammonia, the $NO_x$ purification is performed by converting $NO_x$ in the exhaust emission into the water and the harmless gas. Further, ammonia passed through the $NO_x$ reduction catalyst 16 is oxidized by the ammonia slip oxidation catalyst 18 on the exhaust downstream of the $NO_x$ reduction catalyst 16, and thereafter, is discharged into the atmosphere.

When the temperature in the storage tank 22 rises with a change in the ambient temperature or the like, the aqueous urea solution undergoes chemical change to be gasified into an ammonia series gas, and this ammonia series gas is fills the upper space of the storage tank 22. Then, when the engine operating conditions are changed, so that the exhaust emission temperature reaches the activating temperature for the ammonia slip oxidation catalyst 18 or above, the electric fan 28 is operated for the predetermined period of time. Therefore, the ammonia series gas in the upper space of the storage tank 22 is forcibly discharged by the electric fan 28, and passes through the piping 34 to be discharged to the exhaust upstream of the $NO_x$ reduction catalyst 16. The ammonia series gas discharged to the exhaust upstream of the $NO_x$ reduction catalyst 16 contributes to the reduction reaction in the $NO_x$ reduction catalyst 16, and also, is oxidized in the ammonia slip oxidation catalyst 18 on the downstream of the $NO_x$ reduction catalyst 16. Since the check valve 32 is disposed to the piping 34 which communicatively connects the electric fan 28 to the exhaust pipe 20, even when the electric fan 28 is not operated, it is possible to prevent the exhaust emission flowing through the exhaust pipe 20 from flowing in reverse to the storage tank 22.

Accordingly, whenever the temperature of the ammonia slip oxidation catalyst 18 reaches the activating temperature or above, the ammonia series gas in the upper space of the storage tank 22 is forcibly discharged to the upstream side of the $NO_x$ reduction catalyst 16. Therefore, the concentration of residual ammonia in the storage tank 22 is significantly reduced. Thus, if the injection cap is detached in order to replenish the aqueous urea solution, since the ammonia concentration is low, an operator hardly feels the ammonia odor, and further, the offensive odor produced when the storage tank 22 is opened or closed can be reduced.

Figure 2:
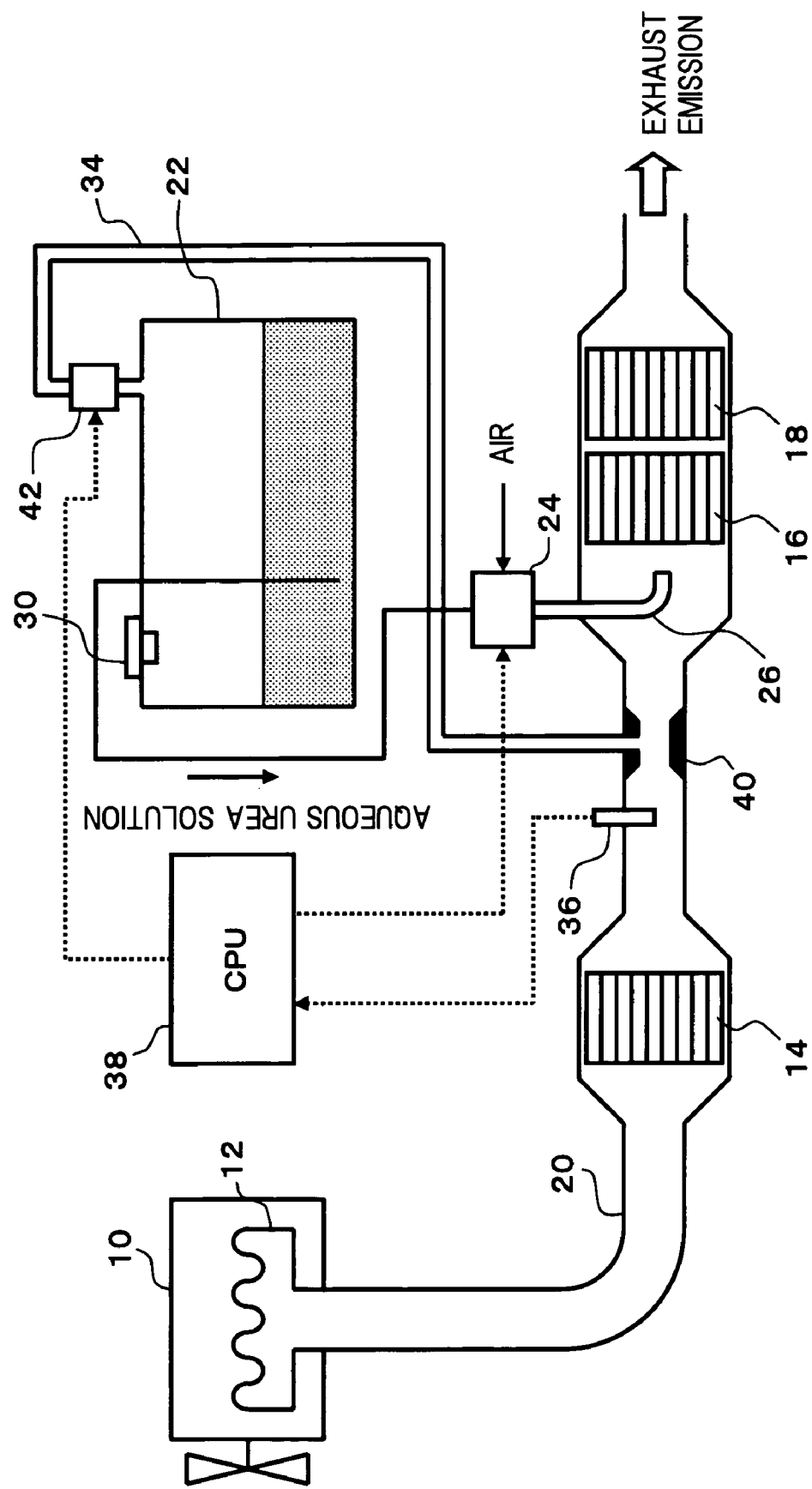
FIG. 2 is a block diagram showing a second embodiment of the exhaust emission purifying apparatus according to the present invention.

In place of the electric fan 28 in the above embodiment, as shown in a second embodiment shown in FIG. 2, a venturi 40 may be disposed to the exhaust pipe 20 on the upstream side of the $NO_x$ reduction catalyst 16, to discharge the ammonia series gas in the upper space of the storage tank 22 to this venturi 40. In this case, the configuration may be such that a normally closed electromagnetic switching valve 42 is disposed to the piping 34, to open the electromagnetic switching valve 42 at the timing for operating the electric fan 28. Thus, the ammonia series gas in the upper space of the storage tank 22 is forcibly discharged by the exhaust emission which passed through the venturi 40 to reduce the pressure thereof. Therefore, the energy for driving the electric fan 28 is no longer necessary, and the battery consumption or the like can be suppressed. In this embodiment, the first discharge-forcing device comprises the piping 34 and the venturi 40.

In each of the above embodiments, there has been adopted the configuration in which the ammonia series gas in the upper space of the storage tank 22 is discharged to the exhaust upstream of the $NO_x$ reduction catalyst 16. However, the ammonia series gas may be discharged to an arbitrary position of the intake system or the exhaust system, provided that this arbitrary position is on the upstream side of the ammonia slip oxidation catalyst 18.

Figure 3:
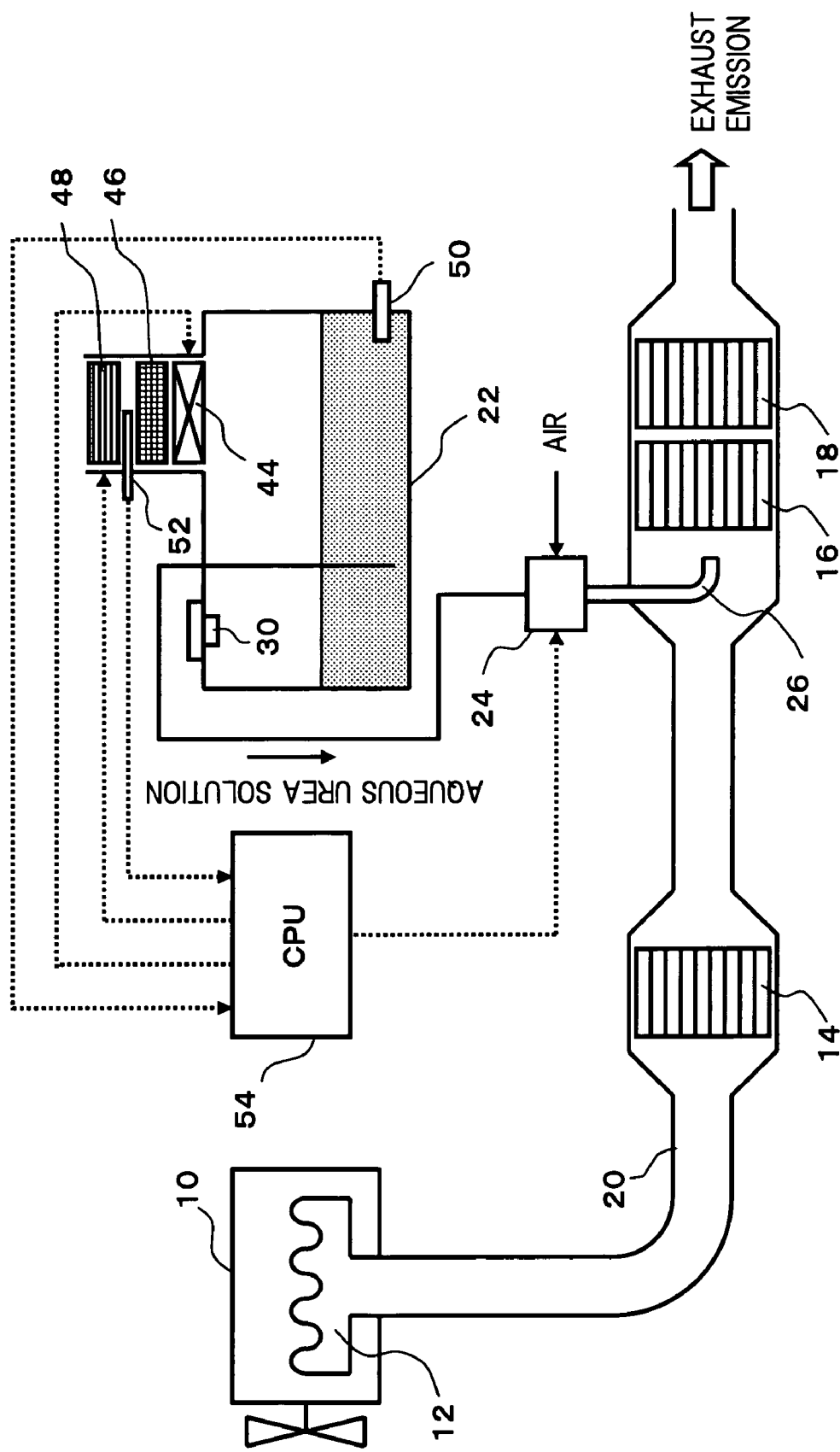
FIG. 3 is a block diagram showing a third embodiment of the exhaust emission purifying apparatus according to the present invention.

FIG. 3 shows a configuration of a third embodiment of the exhaust emission purifying apparatus according to the present invention. The exhaust emission purifying apparatus in the present embodiment has a basic configuration common to that of the exhaust emission purifying apparatus in each of the first and second embodiments shown in FIG. 1 and FIG. 2. Accordingly, the common constitutional elements are denoted by the same reference numerals, and therefore, the description thereof is omitted here.

To the top wall of the storage tank 22, a discharge-forcing device 44 (a second discharge-forcing device), such as an electric fan or the like, forcibly discharging the gas (ammonia series gas) in the upper space of the storage tank 22, is attached. Further, on the discharge side of the discharge-forcing device 44, an adsorbing device 46, such as mordenite, cobalt-supported mordenite or activated carbon, temporarily adsorbing thereto the forcibly discharged gas, and an oxidation catalyst 48 oxidizing the gas desorbed from the adsorbing device 46, are disposed in this order. Here, as the oxidation catalyst 48, it is desirable to use an electrically heated honeycomb catalyst configured by wash coating a catalytic metal on a honeycomb carrier whose flow resistance is small, and incorporating therein a heating device, such as an electrical heater, for accelerating the activation thereof. Note, the heating device may be configured not only to be incorporated in the oxidation catalyst 48 but also to be disposed together with the oxidation catalyst 48.

On the other hand, as a control system for the reducing agent supply device 24, the discharge-forcing device 44 and the heating device, there are provided a reducing agent temperature sensor 50 (reducing agent temperature detecting device) detecting the temperature of the aqueous urea solution in the storage tank 22, a catalyst temperature sensor 52 (catalyst temperature detecting device) detecting the catalyst temperature of the oxidation catalyst 48, and a control device 54 incorporating therein a computer. The control device 54 controls, using a control program stored in a ROM (Read Only Memory) thereof, the reducing agent supply device 24 according to the engine operating conditions, such as the engine rotation speed, the fuel injection amount and the like, and also, controls the discharge-forcing device 44 and the heating device activating the oxidation catalyst 48, based on temperature signals from the reducing agent temperature sensor 50 and the catalyst temperature sensor 52. Note: a second operation control device and a catalyst activating device are respectively realized by the control device 54.

Figure 4:
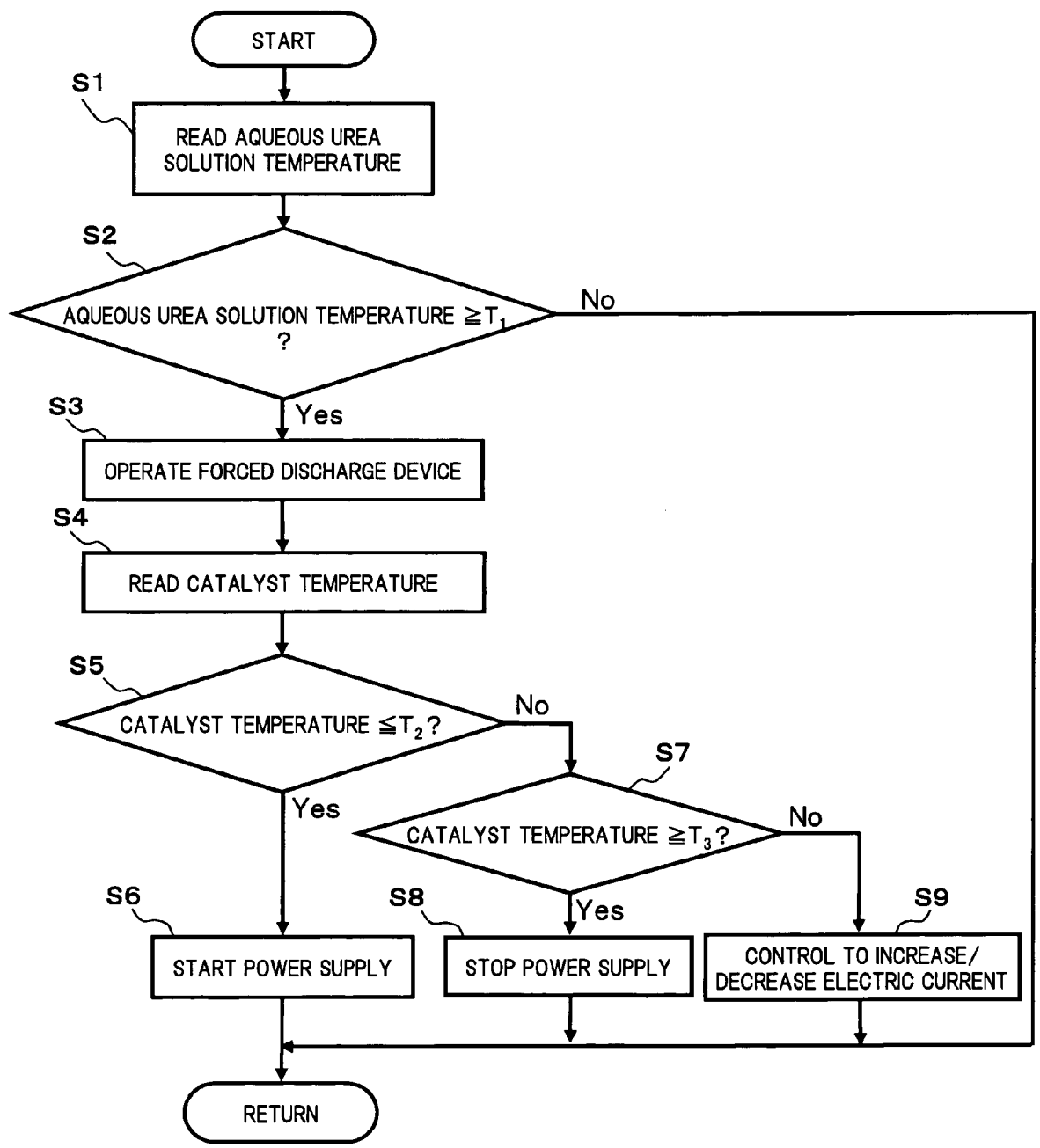
FIG. 4 is a flowchart showing control contents executed by a control device of the above described exhaust emission purifying apparatus.

FIG. 4 is a flowchart showing control contents repetitively executed at predetermined time intervals in the control device 54, after the start of the operation of the engine.

In step 1 (to be referred to as S1 in the figure, and the same rule will be applied hereunder), the temperature of the aqueous urea solution is read out from the reducing agent temperature sensor 50.

In step 2, it is determined whether or not the aqueous urea solution temperature is equal to or higher than a predetermined value $T_1$, namely, whether or not the aqueous urea solution temperature reaches the first predetermined temperature slightly lower than the temperature (for example, 80° C.) at which the ammonia series gas is generated from the aqueous urea solution. Then, if the aqueous urea solution temperature is equal to or higher than the predetermined value $T_1$, the control routine proceeds to step 3 (YES), while if the aqueous urea solution temperature is lower than the predetermined value $T_1$, the control routine is terminated (NO).

In step 3, since the aqueous urea solution temperature in the storage tank 22 reaches the predetermined value $T_1$ or above, namely, the temperature slightly lower than the temperature at which the ammonia series gas is generated, the discharge-forcing device 44 is operated for a predetermined period of time, to forcibly discharge the ammonia series gas in the upper space of the storage tank 22.

In step 4, the catalyst temperature of the oxidation catalyst 48 is read out from the catalyst temperature sensor 52.

In step 5, it is determined whether or not the catalyst temperature of the oxidation catalyst 48 is equal to or lower than a predetermined value $T_2$, namely, whether or not the catalyst temperature reaches the activating temperature (for example, 200° C.) for the oxidation catalyst 48. Then, when the catalyst temperature is equal to or lower than the predetermined value $T_2$, since the oxidation catalyst 48 is not yet activated, the control routine proceeds to step 6 (YES), where the power supply to the heating device is started. On the other hand, when the catalyst temperature is higher than the predetermined value $T_2$, the control routine proceeds to step 7 (NO).

In step 7, it is judged whether or not the catalyst temperature of the oxidation catalyst 48 is equal to or higher than a predetermined value $T_3$, namely, whether or not the catalyst temperature is equal to or higher than a second predetermined temperature (for example, 400° C.) at which the oxidation catalyst 48 is sufficiently activated. Then, when the catalyst temperature is equal to or higher than the predetermined value $T_3$, since the oxidation catalyst 48 is sufficiently activated, the control routine proceeds to step 8 (YES), where the power supply to the heating device is stopped so as to suppress the excessive power consumption. On the other hand, when the catalyst temperature is lower than the predetermined value $T_3$, in order to maintain the catalyst temperature between the predetermined values $T_2$ to $T_3$, the electric current to the heating device is increased or decreased according to the catalyst temperature at the time.

Next, there will be described an operation of the exhaust emission purifying apparatus in the third embodiment of the above configuration. Note, the $NO_x$ purification in the present embodiment is similar to that in the first embodiment shown in FIG. 1, and therefore, the description thereof is omitted here.

When the temperature in the storage tank 22 rises with the change in the ambient temperature or the like, the aqueous urea solution undergoes the chemical change to be changed into the ammonia series gas, and this ammonia series gas is filled in the upper space of the storage tank 22. At this time, since the aqueous urea solution temperature reaches the predetermined value $T_1$ or above, the discharge-forcing device 44 is operated for the predetermined period of time by the control device 54. Therefore, the ammonia series gas in the upper space of the storage tank 22 is forcibly discharged by the discharge-forcing device 44, to be temporarily adsorbed to the adsorbing device 46. Then, the ammonia series gas adsorbed to the adsorbing device 46 is gradually desorbed when predetermined conditions are satisfied, and is oxidized in the oxidation catalyst 48 to be converted into the harmless substance, and thereafter, is discharged into the atmosphere.

Consequently, even in a situation where the ammonia series gas is generated from the aqueous urea solution in the storage tank 22, since the ammonia series gas in the upper space of the storage tank 22 is forcibly discharged, the residual ammonia concentration is significantly lowered. Therefore, if the protective cap 30 is detached for the purpose of replenishing the aqueous urea solution into the storage tank 22, since the ammonia concentration is low, the operator hardly feels the ammonia odor, and further, the offensive odor produced when the storage tank 22 is opened or closed can be reduced. Further, since the ammonia series gas forcibly discharged from the upper space of the storage tank 22 is temporarily adsorbed by the adsorbing device 46 and thereafter is gradually desorbed, and is oxidized in the oxidation catalyst converter 48, it is possible to prevent the ammonia odor from reeking around the storage tank 22.

Further, since the heating device is controlled so that the catalyst temperature of the oxidation catalyst 48 is maintained in the predetermined temperature range equal to or higher than the activating temperature, it is possible to hold the oxidation catalyst 48 in the activated state while suppressing the excessive power consumption. In particular, when the catalyst temperature of the oxidation catalyst 48 is equal to or higher than the predetermined value $T_3$, namely, when the oxidation catalyst 48 is sufficiently activated, since the operation of the heating device is stopped, the temperature of the oxidation catalyst 48 does not excessively rise, and therefore, the heat damage can be prevented.

Incidentally, in the above embodiment, the control elements are controlled using the control program of the control device 54. However, the control elements may be directly controlled by a thermo-switch which turns an electric circuit ON or OFF at the predetermined temperature. In this case, since an expensive control device is no longer necessary, the cost reduction can be achieved.

Figure 5:
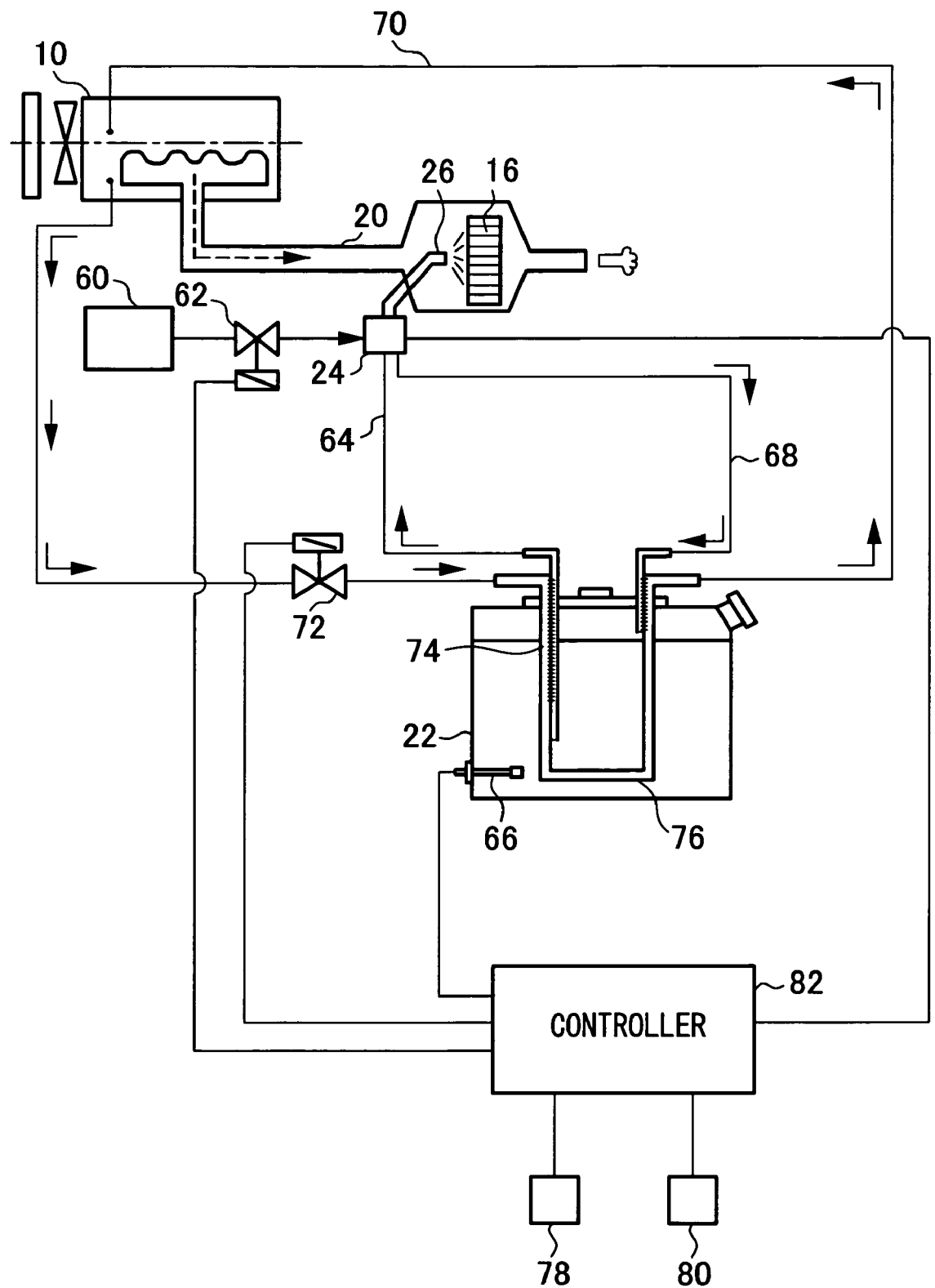
FIG. 5 is a block diagram showing a fourth embodiment of the exhaust emission purifying apparatus according to the present invention.

FIG. 5 shows a configuration of a fourth embodiment of the exhaust emission purifying apparatus according to the present invention. The exhaust emission purifying apparatus in the present embodiment has a basic configuration common to that of the exhaust emission purifying apparatus in each of the first through third embodiments shown in FIG. 1 through FIG. 3. Accordingly, the common constitutional elements are denoted by the same reference numerals, and therefore, the description thereof is omitted here.

To the exhaust pipe 20 serving as the exhaust passage of the engine 10, the $NO_x$ reduction catalyst 16 reductively purifying $NO_x$ is disposed. Further, on the upstream side of the $NO_x$ reduction catalyst 16, the injection nozzle 26 injecting to supply the reducing agent through an injection hole opened to the inside of the exhaust pipe 20, is disposed. Then, the compressed air stored in an air reservoir tank 60 passes through an electromagnetic switching valve 62 to be supplied to the reducing agent supply device 24.

The urea water serving as the reducing agent, which is stored in the storage tank 22, is supplied to the reducing agent supply device 24 via supply piping 64. Note, the aqueous ammonia solution or a diesel oil mainly containing hydrocarbon may be used for the reducing agent, other than the urea water. Further, in the storage tank 22, there is disposed a reducing agent temperature sensor 66 (reducing agent temperature detecting device) detecting a temperature of the urea water stored in the storage tank 22.

The reducing agent supply device 24, which includes therein a pump, operates the pump to load the urea water on the compressed air supplied from the air reservoir tank 60, and makes the urea water to be in an atomized state, to supply it to the injection nozzle 26. A loading amount of the urea water is made variable by controlling an operation of the pump. Then, the excessive urea water, which was not supplied into the exhaust pipe 20 by the reducing agent supply device 24, is returned into the storage tank 22 via return piping 68.

On the other hand, on a cooling water circulating passage 70 which is disposed in parallel to a cooling water circulating passage (not shown in the figure) of the engine 10, an electromagnetic switching valve 72 (blocking device) and a heat exchanging device 76 (heating device) which is provided with a heat exchanger pipe 74 heat exchanging with the urea water in the storage tank 22, are disposed in this order from the upstream. The electromagnetic switching valve 72 is operated to open and close, to open and block the cooling water circulating passage 70. Then, when the electromagnetic switching valve 72 is opened, the cooling water which is heated by the engine 10 to operate as a heating medium is circulated within the cooling water circulating passage 70, so that the heat exchanging device 76 performs the heat exchange between the cooling water and the urea water via the heat exchanger pipe 74 to heat the urea water in the storage tank 22.

To the engine 10, there are disposed a cooling water temperature sensor 78 (heating medium temperature detecting device) detecting the temperature of the cooling water and an operating condition detecting sensor 80 detecting the engine operating conditions, such as the rotation speed, a load and the like, of the engine 10. A controller 82 incorporating therein a microcomputer receives the engine operating conditions from the operating condition detecting sensor 80, and controls to operate the pump in the reducing agent supply device 24 and the electromagnetic switching valve 62, so that the urea water of an optimum amount corresponding to the engine operating conditions is injected from the injection nozzle 26 to be supplied into the exhaust pipe 20. Further, the controller 82 receives the urea water temperature and the cooling water temperature respectively from the reducing agent temperature sensor 66 and the cooling water temperature sensor 78, and controls to operate the electromagnetic switching valve 72.

Figure 6:
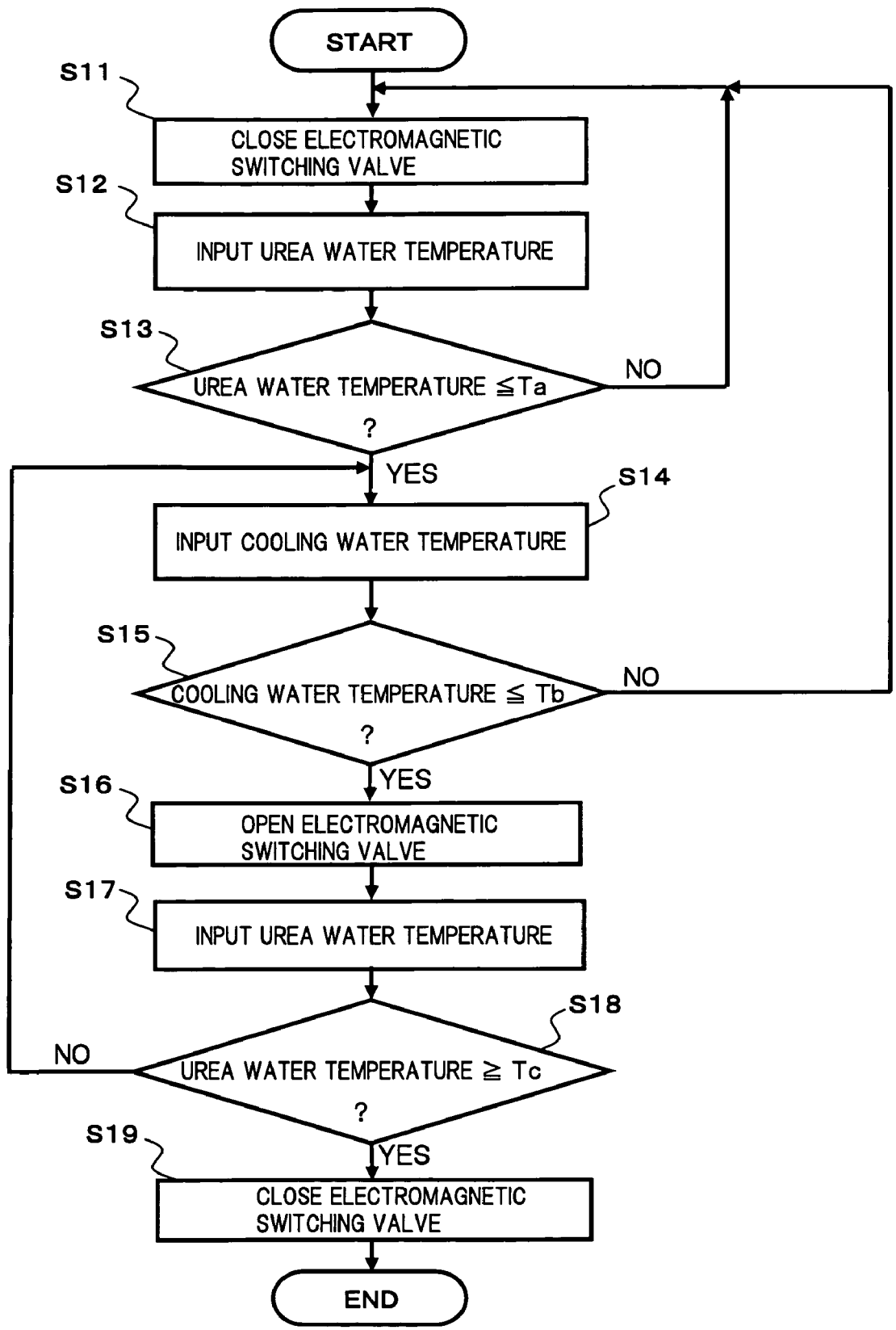
FIG. 6 is a flowchart showing a control routine of an electromagnetic switching valve in the above described exhaust emission purifying apparatus.

Here, there will be described using FIG. 6, the control routine of the electromagnetic switching valve 72 by the controller 82. Firstly, the controller 82 is supplied with the power when a power supply switch such as a key switch is turned ON, to start the control. The control according to a flowchart in the figure is repetitively executed at every predetermined period of time.

At first, in step 11 (to be referred to as S11 in the figure, and the same rule will be applied hereunder), the electromagnetic switching valve 72 is controlled to be closed.

In step 12, the temperature of the urea water in the storage tank 22 is input from the reducing agent temperature sensor 66.

In step 13, it is determined whether or not the urea water temperature input in step 12 is equal to or lower than the predetermined temperature Ta. When the urea water temperature is equal to or lower than the predetermined temperature Ta, the control routine proceeds to step 14 (YES). On the other hand, when the urea water temperature is higher than the predetermined temperature Ta, the control routine returns to step 11 (NO). The predetermined temperature Ta may be set to be slightly higher than the freezing temperature of the urea water.

In step 14, the temperature of the cooling water is input from the cooling water temperature sensor 78.

In step 15, it is determined whether or not the cooling water temperature input in step 14 is equal to or lower than the predetermined temperature Tb (third predetermined temperature). When the cooling water temperature is equal to or lower than the predetermined temperature Tb, the control routine proceeds to step 16 (YES). On the other hand, when the cooling water temperature is higher than the predetermined temperature Tb, the control routine returns to step 11 (NO). The predetermined temperature Tb may be set to be slightly lower than the lower limit temperature at which ammonia is generated from the urea water, and may be set to be slightly lower than 80° C., for example in the case of the urea water of 35 weighted percentage concentration.

In step 16, the electromagnetic switching valve 72 is controlled to be opened.

In step 17, the temperature of the urea water in the storage tank 22 is input from the reducing agent temperature sensor 66.

In step 18, it is determined whether or not the urea water temperature input in step 17 is equal to or higher than the predetermined temperature Tc (fourth predetermined temperature). When the urea water temperature is equal to or higher than the predetermined temperature Tc, the control routine proceeds to step 19 (YES). On the other hand, when the urea water temperature is lower than the predetermined temperature Tc, the control routine returns to step 14 (NO). The predetermined temperature Tc is set to be slightly higher than the predetermined temperature Ta, so that the temperature of the urea water in the storage tank 22 can be controlled to be between the predetermined temperature Ta and the predetermined temperature Tc.

In step 19, the electromagnetic switching valve 72 is controlled to be closed, and thereafter, the control routine proceeds to END.

A series of controls in steps 11, 14 and 15 corresponds to first control means, and a series of controls in steps 17 through 19 corresponds to second control means.

Next, there will be described an operation of the exhaust emission purifying apparatus in the fourth embodiment of the above configuration. The exhaust emission from the engine 10 passes through the exhaust pipe 20 to be led into the $NO_x$ reduction catalyst 16. At this time, the controller 82 receives the engine operating conditions, such as the rotation speed, the load and the like, of the engine 10, from the operating condition detecting sensor 80, and controls operating of the pump in the reducing agent supply device 24 and the electromagnetic switching valve 62, so that the urea water of the optimum amount corresponding to the engine operating conditions is injected from the injection nozzle 26 to be supplied into the exhaust pipe 20. As a result, $NO_x$ in the exhaust emission is reductively removed with efficiency by the $NO_x$ reduction catalyst 16.

When the temperature of the urea water in the storage tank 22 is equal to or lower than the predetermined temperature Ta, namely, there is a possibility of freeze of the urea water, and also, when the temperature of the cooling water of the engine 10 is equal to or lower than the predetermined temperature Tb, namely, the temperature of the cooling water is not high, the electromagnetic switching valve 72 is opened. As a result, since the cooling water heated by the engine 10 is circulated within the cooling water circulating passage 70, the urea water in the storage tank 22 is subjected to the heat exchange with the cooling water via the heat exchanger pipe 74. Consequently, the freeze of the urea water can be prevented.

At this time, when the temperature of the cooling water of the engine 10 is higher than the predetermined temperature Tb, namely, when the temperature of the cooling water is high, since the electromagnetic switching valve 72 is closed, the cooling water of high temperature is prevented from being circulated within the storage tank 22. As a result, it is possible to suppress the generation of ammonia from the urea water in the storage tank 22. Therefore, if the operator opens the injection port of the storage tank 22, the discharge of ammonia from the injection port is suppressed, and further, it is possible to suppress the production of the offensive odor.

Further, also when the temperature of the urea water in the storage tank 22 is equal to or higher than the predetermined temperature Tc, namely, the temperature of the urea water in the storage tank 22 is high, since the electromagnetic switching valve 72 is closed, the urea water in the storage tank 22 is held at the temperature at which ammonia is not generated. As a result, it is further possible to suppress the generation of ammonia from the urea water in the storage tank 22.

Moreover, when the temperature of the cooling water is higher than the freezing temperature of the urea water immediately after the operation of the engine 10 is started, it is desirable that the controller 82 controls the electromagnetic switching valve 72 to be forcibly opened for a predetermined period of time. This control corresponds to third control means. As a result, when the temperature of the cooling water is higher than the freezing temperature of the urea water, since the cooling water is circulated within the cooling water circulating passage 70 for the predetermined period of time immediately after the operation of the engine 10 is started, it is possible to prevent the cooling water from remaining in the cooling water circulating passage 70 while preventing the urea water from being cooled to be frozen by the circulation of the cooling water of low temperature within the storage tank 22, and also, it is possible to suppress the degradation of the quality of the cooling water.

In addition, it is desirable to enable the electromagnetic switching valve 72 to be manually opened. Thereby, when the cooling water is exchanged, it is possible to discharge the cooling water remaining in the cooling water circulating passage 70, to exchange all amount of the cooling water.

We claim:

1. An exhaust emission purifying apparatus for an engine, comprising:
    a reduction catalyst disposed in an engine exhaust system, for reductively purifying nitrogen oxides with a reducing agent;
    a reducing agent oxidation catalyst disposed on an exhaust downstream side of said reduction catalyst, for oxidizing the reducing agent passed through said reduction catalyst;
    a storage tank for storing therein the reducing agent;
    a reducing agent supply device for supplying the reducing agent from said storage tank to said reduction catalyst;
    a first discharge-forcing device for forcibly discharging a gas in an upper space of said storage tank to an intake system or said exhaust system on an upstream side of said reducing agent oxidation catalyst;
    a temperature detecting device for detecting a temperature of said reducing agent oxidation catalyst; and
    a first operation control device for operating said first discharge-forcing device when the temperature detected by said temperature detecting device reaches an activating temperature for said reducing agent oxidation catalyst or above.

2. The apparatus according to claim 1, wherein said first operation control device is configured to operate said first discharge-forcing device for a predetermined period of time.

3. The apparatus according to claim 1, wherein said first discharge-forcing device is an electric fan disposed on piping which communicatively connects the upper space of said storage tank to the intake system or the exhaust system on the upstream side of said reducing agent oxidation catalyst.

4. The apparatus according to claim 3, wherein said piping is disposed with a check valve which is configured to be opened only in a direction in which the gas in the upper space of said storage tank is discharged to the intake system or the exhaust system.

5. The apparatus according to claim 1, wherein said first discharge-forcing device comprises: a venturi disposed in the intake system or the exhausted system, on the upstream side of said reducing agent oxidation catalyst; and a switching valve disposed on piping for providing a fluid communication between the upper space of said storage tank and said venturi, and said first operation control device for opening said switching valve when the temperature detected by said temperature detecting device reaches the activating temperature for said reducing agent oxidation catalyst or above.

6. The apparatus according to claim 1, wherein said temperature detecting device is configured to detect the temperature of said reducing agent oxidation catalyst indirectly via the exhaust emission temperature on the upstream side of said reducing agent oxidation catalyst.

7. An exhaust emission purifying apparatus for an engine, comprising:
    a reduction catalyst disposed in an engine exhaust system, for reductively purifying nitrogen oxides with a reducing agent;
    a storage tank for storing therein the reducing agent;
    a reducing agent supply device for supplying the reducing agent stored in said storage tank to said reduction catalyst;
    a second discharge-forcing device for forcibly discharging the gas in an upper space of said storage tank;
    an adsorbing device for temporarily adsorbing thereto the gas forcibly discharged by said second discharge-forcing device; and
    an oxidation catalyst for oxidizing the gas desorbed from said adsorbing device,
    wherein said second discharge-forcing device, said adsorbing device and said oxidation catalyst are disposed on a top wall of the storage tank,
    wherein after passing through the oxidation catalyst, the gas is to be discharged into an atmosphere.

8. The apparatus according to claim 7, further comprising:
    a reducing agent temperature detecting device for detecting the temperature of the reducing agent in said storage tank; and
    a second operation control apparatus for operating said second discharge-forcing device when the temperature of the reducing agent detected by said reducing agent temperature detecting device is equal to or higher than the first predetermined temperature.

9. The apparatus according to claim 8, wherein said second operation control device is configured to operate said second discharge-forcing device for a predetermined period of time.

10. The apparatus according to claim 7, further comprising:
    a catalyst temperature detecting device for detecting the temperature of said oxidation catalyst; and
    a catalyst activating device for activating said oxidation catalyst based on the catalyst temperature detected by said catalyst temperature detecting device.

11. The apparatus according to claim 10, further comprising;
    a heating device for heating said oxidation catalyst,
    wherein said catalyst activating device is configured to control said heating device so that the catalyst temperature detected by said catalyst temperature detecting device reaches the activating temperature for said oxidation catalyst or above.

12. The apparatus according to claim 11, wherein said catalyst activating device is configured to stop an operation of said heating device when the catalyst temperature detected by said catalyst temperature detecting device reaches the second predetermined temperature or above.

13. The apparatus according to claim 7, wherein said adsorbing device is mordenite, cobalt-supported mordenite or activated carbon.

14. The apparatus according to claim 7, wherein said oxidation catalyst is an electrically heated honeycomb catalyst.

15. An exhaust emission purifying apparatus for an engine, comprising:
- a reduction catalyst disposed in an engine exhaust system, for reductively purifying nitrogen oxides with a reducing agent;
- a storage tank for storing therein the reducing agent;
- a reducing agent supply device for supplying the reducing agent stored in said storage tank to said reduction catalyst;
- a heating device for circulating a heating medium heated by said engine, within said storage tank, to heat said reducing agent stored in said storage tank;
- a blocking device for blocking a passage which leads said heating medium into said storage tank;
- a heating medium temperature detecting device for detecting the temperature of said heating medium; and
- first control means for controlling said blocking device to block said passage, when the heating medium temperature detected by said heating medium temperature detecting device is higher than the third predetermined temperature.

16. The apparatus according to claim 15, further comprising: a reducing agent temperature detecting device for detecting the temperature of the reducing agent stored in said storage tank; and second control means for controlling said blocking device to block said passage, when the reducing agent temperature detected by said reducing agent temperature detecting device is equal to or higher than the fourth predetermined temperature.

17. The apparatus according to claim 15 or claim 16, further comprising: third control means for controlling said blocking device to forcibly cancel the blocking of said passage for a predetermined period of time, immediately after an operation of said engine is started, and also, when the heating medium temperature detected by said heating medium temperature detecting device is higher than the freezing temperature of the reducing agent.

18. The apparatus according to claim 15, wherein said blocking device is manually controllable, to cancel the blocking of said passage.

* * * * *